United States Patent [19]
Cherin et al.

[11] 4,146,301
[45] Mar. 27, 1979

[54] OPTICAL RIBBON CONNECTOR

[75] Inventors: Allen H. Cherin, Doraville; Anthony Osborne, Duluth, both of Ga.

[73] Assignee: Bell Telephone Laboratories, Incorporated, Murray Hill, N.J.

[21] Appl. No.: 800,275

[22] Filed: May 25, 1977

[51] Int. Cl.² ............................................. G02B 5/14
[52] U.S. Cl. ............................................... 350/96.21
[58] Field of Search ................ 350/96.20, 96.21, 96.29

[56] References Cited

U.S. PATENT DOCUMENTS

| | | | |
|---|---|---|---|
| 3,783,065 | 1/1974 | Stone | 350/96.21 |
| 3,864,018 | 2/1975 | Miller | 350/96.21 |
| 3,912,574 | 10/1975 | Cherin et al. | 350/96.21 |

OTHER PUBLICATIONS

"Optical Fiber Vacuum Chuck" by Benson et al., Applied Optics, April 1975, vol. 14, No. 4, pp. 816–817.
"Retention Grooves for Optical-Fibre Connectors" by Höllerl et al. Electronics Letters, Feb. 1977, vol. 13, No. 3 pp. 74–76.

*Primary Examiner*—John K. Corbin
*Assistant Examiner*—Stewart Levy
*Attorney, Agent, or Firm*—Sylvia J. Chin

[57] ABSTRACT

Splicing of two mating optical fiber ribbons is achieved with a connector comprising a multigrooved substrate with vacuum slots normal to the fiber-receiving grooves and a mating cover. Air drawn through the vacuum slots during the splicing operation holds the exposed ribbon fibers in the grooves to ensure transverse alignment of the fibers for splicing. The cover mounts onto the substrate to lock the fibers in place after they have been axially aligned and abutted. Slots in the cover allow venting to prevent suction buildup under the cover.

21 Claims, 11 Drawing Figures

OPTICAL RIBBON CONNECTOR

FIELD OF THE INVENTION

This relates to the splicing of optical fibers and more particularly to apparatus for splicing arrays of optical fibers.

BACKGROUND OF THE INVENTION

The mechanical fragility and small size of light-transmitting optical fibers have led to the development of the optical fiber ribbon structure. Such a structure typically comprises a plurality of nominally spaced, coplanar and parallel optical fibers embedded in some supporting medium. The medium mechanically protects the fibers while the fiber spacing geometry facilitates gang splicing.

Prior art connectors, such as disclosed in U.S. patent application, Ser. No. 724,653, filed Sept. 20, 1976, and assigned to the assignee hereof, featuring fiber-receiving grooves have been found to facilitate accurate and reliable low-loss splices between ribbons of fibers. These prior art connectors rely on the precise fiber spacing geometry to place the fibers into the fiber-receiving grooves. When using these connectors, the supporting medium is stripped from the ribbon ends to expose the fibers for placement in the grooves, which have a spacing geometry corresponding to the nominal spacing of the fibers. In practice, however, after stripping, the fibers tend to wander and stray from their nominal spacing. Also, the fibers may deform and gain in misalignment from the stripping operation.

Sometimes the fibers are coated with additional protective layers before being embedded in a supporting medium to form an optical fiber ribbon. In such a ribbon, the fiber spacing geometry is generally made from the coated fibers. Because the protective layers often coat the fibers unevenly, the fibers are misaligned though the fiber spacing geometry is maintained. Thus, the coatings, along with the supporting medium, are removed to prepare the optical fibers for splicing.

Deviations from the nominal fiber spacing geometry make fiber insertion into the grooves of these connectors exceedingly difficult for the craftsman, especially in the outside plant. Additional steps are often needed to facilitate fiber placement. For example, one technique which can be used is precisely prealigning the exposed fibers in preliminary external fiber-aligning equipment and maintaining the prealignment while the fibers are placed into the grooves and until the splice is completed.

The additional steps complicate the splicing process and impose greater skill and dexterity on the craftsman in assembling a splice connection. Greater manufacturing restraints in fabricating splicing apparatus are also required to ensure alignment between the external fiber-aligning equipment and the connectors.

Also, this technique requires stripping of additional supporting medium away from the ribbon ends to permit prealignment in the external fiber-aligning equipment. Additional stripping results in less mechanical support and protection of the fibers desirable once the splice has been completed by leaving the fibers exposed where the external equipment held them aligned. This complicates ribbon termination in connecting hardware, which is desirable to mechanically protect the fibers and to facilitate use of the ribbon structure to strain relieve the splice joint.

One approach not using external fiber-aligning equipment requires that the fibers be in a touching array for placement in the grooves; the fibers support one another to maintain the desired spacing geometry. However, errors arise because if one fiber is offset, the offset is passed to the other fibers. Also, if one fiber breaks, the fiber spacing geometry is lost. Furthermore, this approach is not available where the fibers are coated and the protective layers must be removed for splicing.

Hence, it is desirable to develop connecting apparatus which relaxes the spacing requirements of the fibers.

It is also desirable that the connector include internal means for easing fiber insertion and holding the fibers in their respective grooves, thereby eliminating the need for external precision fiber-aligning equipment.

It is further desirable that the fibers be held in the grooves at the splice point during splicing.

Moreover, it is desirable that the splice connection be easy to assemble requiring a minimum of skill and dexterity on the part of a craftsman to effect a reliable low-loss splice joint.

SUMMARY OF THE INVENTION

A vacuum-assisted connector has been developed which encompasses the above features. In one illustrative embodiment, the connector comprises a multi-grooved substrate with vacuum slots normal to the grooves and a mating cover. During the splicing operation, the multigrooved substrate, which receives the fibers of both arrays, mounts onto a vacuum fixture. The fibers are placed into the grooves by approximately positioning the fibers over the grooves and brushing them into place. The spacing of the exposed fibers from the ribbon structure is sufficient for approximate fiber positioning over the grooves. As the exposed fibers of each ribbon are placed into the grooves, air drawn down through the vacuum slots by the vacuum fixture aids to urge the fibers into and hold them in the respective grooves. The air suction also ensures that the fibers abut the walls of the grooves to maintain transverse alignment of the fibers during splicing.

After the corresponding mating fibers of the two arrays have been placed into their grooves and axially abutted, the cover mounts onto the multigrooved substrate to lock the fibers in place whereby the splice is completed and the vacuum fixture is removed.

The cover features vent slots which permit air flow through the cover so that vacuum-generated pressure does not build up on the cover to affect cover placement onto the substrate or the vacuum hold on the fibers in the grooves.

Another embodiment of the invention is a rearrangeable connector which features a single substrate with one set of fiber-receiving grooves for the mating of two arrays of fibers and vacuum slots for assisting fiber alignment. Two covers are utilized; one for locking each array of fibers in place. The multigrooved substrate is housed within a split outer sleeve that opens to permit insertion or removal of the covers individually and closes to lock the splice covers in place by simply rotating the shell with respect to the multigrooved substrate. The outer shell includes vacuum passages through which air can be drawn through the vacuum slots in the substrate when the shell is in the open position to assist in fiber alignment.

The invention and its further objects, features and advantages will be readily comprehended from a read-

DETAILED DESCRIPTION OF ILLUSTRATIVE EMBODIMENTS

Figure 1:
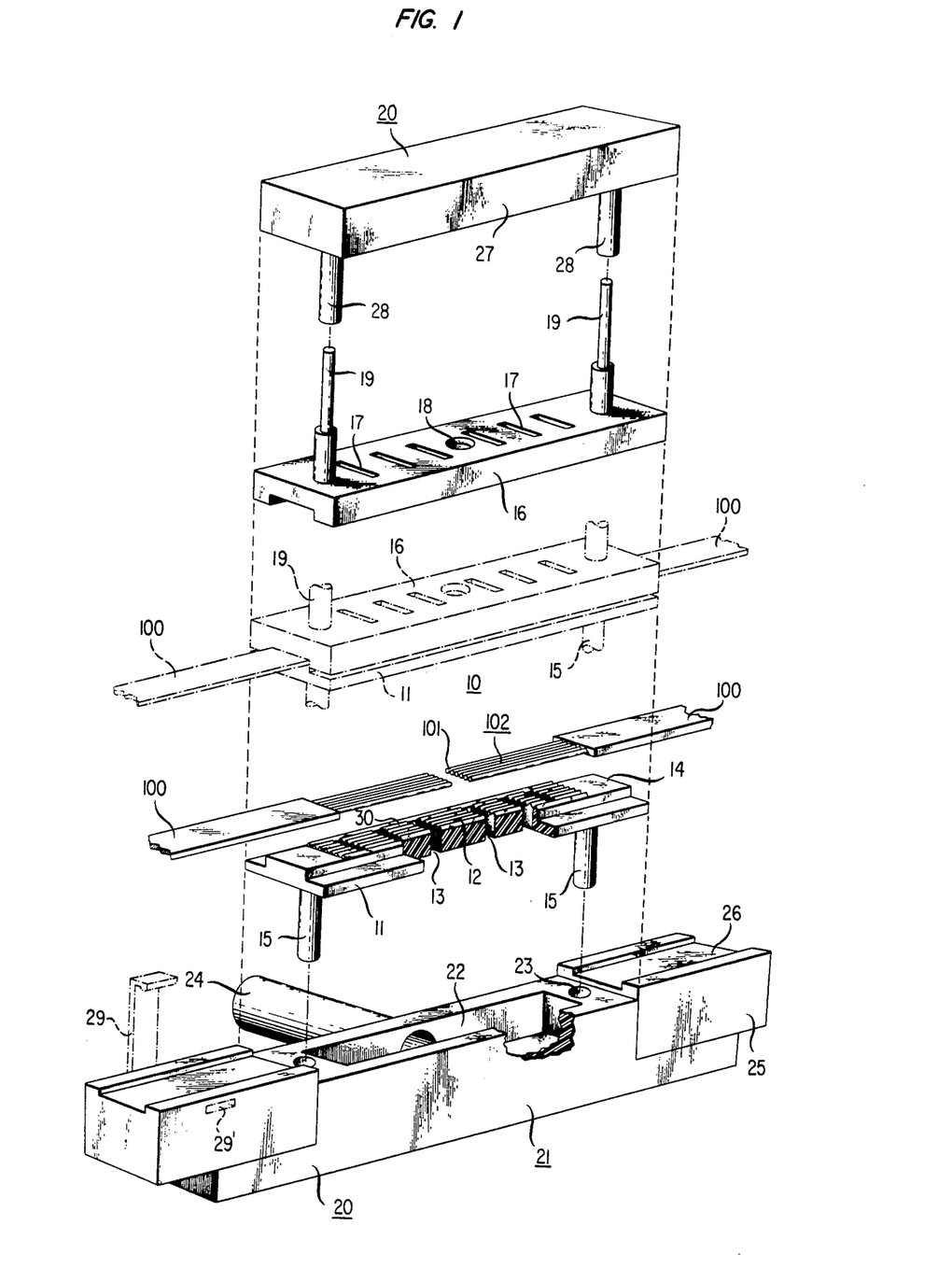
FIG. 1 is an exploded assembly view in partial cross-section of one embodiment of the connector and related splicing fixture made in accordance with this invention.

An illustrative embodiment 10 of a connector made pursuant to this invention is depicted in FIG. 1 with its related splicing fixture 20.

Connector 10, as depicted in FIG. 1, comprises a substrate 11 which includes a plurality of parallel-spaced optical fiber receiving grooves 12 along its top surface 30 and several vacuum slots 13 cut across the grooves to assist in fiber positioning, and a mating cover 16 which mounts onto substrate 11 to lock two mating ribbons 100 and their exposed arrays 102 of fibers 101 in place. Substrate 11 also comprises on the underside pins 15 which aid to mount substrate 11 onto splicing fixture 20 and serrated surfaces 14 at either end of the grooves 12 which aid to secure the ribbons 100 in connector 10.

Cover 16 comprises vacuum vent slots 17 for facilitating air flow to substrate 11, tooling pins 19 for attaching cover 16 to the splicing fixture 20, and an orifice 18 through which to apply index-matching material to the splice point. While not illustrated, the cover 16 can also be modified to have a serrated surface at either end to grip the spliced ribbons.

The splicing fixture 20, which is used in the actual splicing operation with connector 10, includes a vacuum base 21, two ribbon support ramps 25, and a cover holder 27.

Base 21 comprises a cavity 22, aligning pin slots 23, and a hose 24 which connects cavity 22 to a vacuum pump, which is not shown. Each ramp 25 comprises a channel 26 for preliminarily lining up and supporting its corresponding ribbon 100 for splicing.

Cover holder 27 comprises pin slots 28 for holding cover 16 during the splicing operation. Cover holder 27 moves up and down vertical aligning rails (not shown), which maintain the cover holder 27 in alignment with base 21, and in turn cover 16 in alignment with substrate 11 to facilitate placement of cover 16 onto substrate 11.

It is also occasionally desirable that the ramps 25 include ribbon clamps 29 to hold the ribbons 100 during the splicing operation (one shown in FIG. 1). Alternatively, vacuum-assistance might be used to hold the ribbons in the channels 26.

Figure 2:
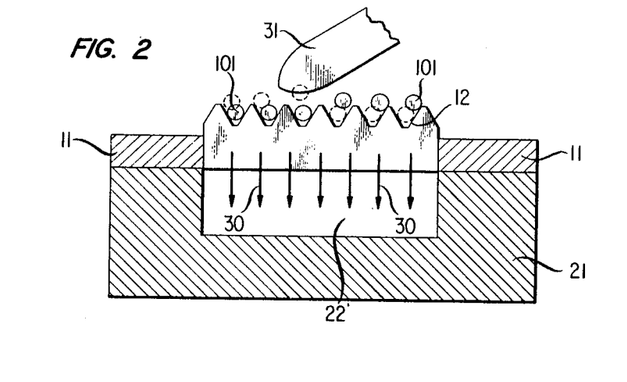
FIG. 2 shows in cross-section along one of the vacuum slots of the FIG. 1 substrate, the fibers of one array being placed into their grooves.

FIG. 2 depicts a cross-sectional view along a vacuum slot 13, substrate 11 mounted onto fixture base 21. The grooves 12 in the illustrative substrate 11 are flattened at the bottom 12' and precisely spaced to have the nominal spacing of the fibers 101 in the ribbons 100. In this embodiment, both the substrate 11 and cover 16 are injection molded plastic.

Upon placement into the grooves, the fibers fit so that the fiber tops are at the same height as the substrate 11 portions which separate the grooves 12.

To provide a more complete understanding of the invention, a typical assembly or splicing operation with the FIG. 1 apparatus is given.

The substrate 11 is mounted onto base 21 over cavity 22 to form a vacuum chamber 22'. The substrate pins 15 fit into the pin slots 23 to ensure proper mounting of substrate 11 onto base 21 and alignment of plate 11 with the ramps 25. The vacuum pump is then turned on so that air is drawn down through the vacuum slots 13, as depicted by arrows 30 in FIG. 2.

As with the prior art grooved connectors, the supporting medium of each of the ribbons 100 is stripped back to expose the parallel fibers 101 at their ends. Advantageously, the fibers of each ribbon are cut along one plane normal to their longitudinal axes so that they will abut in the same plane. Also the ends of the fibers are desirably flat to ensure good splicing connections.

After the fibers 101 of each ribbon 100 have been prepared for splicing, the ribbons 100 are manually placed on the ramps 25 in channels 26 so that the exposed fibers 101 are substantially positioned over their respective grooves 12 with the fiber ends near the center line or splice point of substrate 11. A pin 31 is then brushed across the fibers to urge the fibers 101 into their respective grooves 12 as depicted in FIG. 2. Each fiber 101 is positioned into its respective groove 12 independent of the other fibers being placed.

At the same time, air drawn through the vacuum slots 13 assists to pull the fibers 101 to their respective grooves 12 and hold the fibers 101 in abutment against the grooves to ensure transverse alignment of the fibers 101. At least two vacuum slots 13 are sufficiently adjacent to the splice point from either side such that the fibers 101 of each array are maintained in their grooves 12 at the splice point by vacuum-assistance.

As is apparent from FIG. 2, in a somewhat exaggerated view, connector 10 permits placement of the fibers 101 in their grooves with relative ease even though the fibers 101 might wander somewhat from their nominal spacing.

After the fibers 101 of both ribbons have been positioned in their grooves 12, both ribbons 100 are moved, if necessary toward each other to achieve substantial axial abutment of the mating fibers 101 of each ribbon.

The cover 16 is then placed into mating engagement with substrate 11 to contain the aligned fibers 101 in their respective grooves 12. The vacuum vent slots 17 in cover 16 advantageously permit air flow to substrate 11 to thus prevent vacuum-generated forces on cover 16 as it is being mounted onto substrate 11, which might affect its placement onto substrate 11 and the vacuum hold on the fibers in the grooves. The vacuum vent slots 17 are advantageously molded so as to correspond and be in vertical alignment with the vacuum slots 13 in substrate 11.

For a permanent splice, the cover plate 16 can be permanently cemented to substrate 11 to lock the fibers in place, whereby the splicing operation is completed and the connector 10 is removed from splicing fixture 20. When used for a permanent splice, the pins 15 and 19 can advantageously be molded to the cover 16 and substrate 11 respectively; the pins are then broken off after the assembly or splicing operation is complete.

Refractive index-matching material is advantageously applied to the splice joint after the cover 16 is mounted via orifice 18 in cover 16.

In accordance with this invention, the ribbons 100 terminate within the connector 10. The serrated surfaces 14 grip the ribbons 100 at either end of the substrate 11 to provide strain relief.

Figure 3:
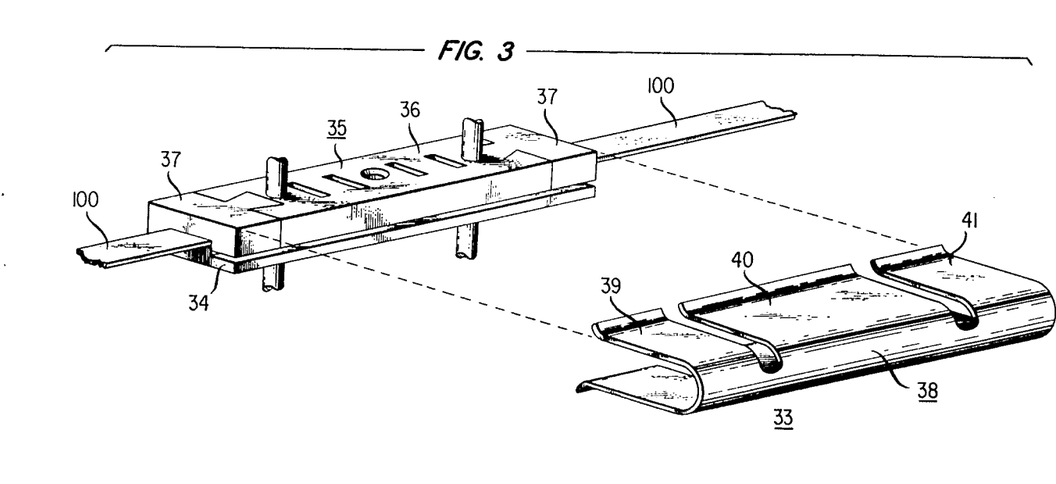
FIG. 3 is a partially exploded assembly view of a variation of the inventive connector featuring a spring-clip securing means.
Figure 4:
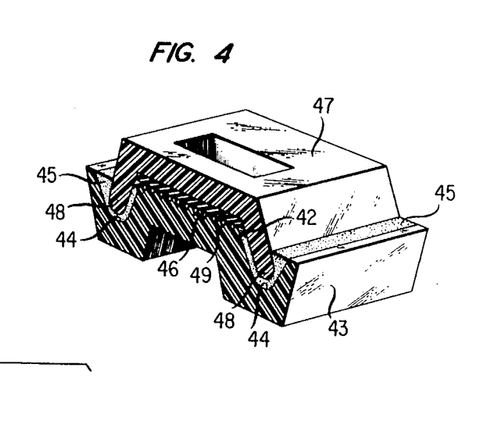
FIG. 4 shows in perspective view in partial cross-section another variation of the inventive connector featuring an epoxied splice joint.
Figure 5A:
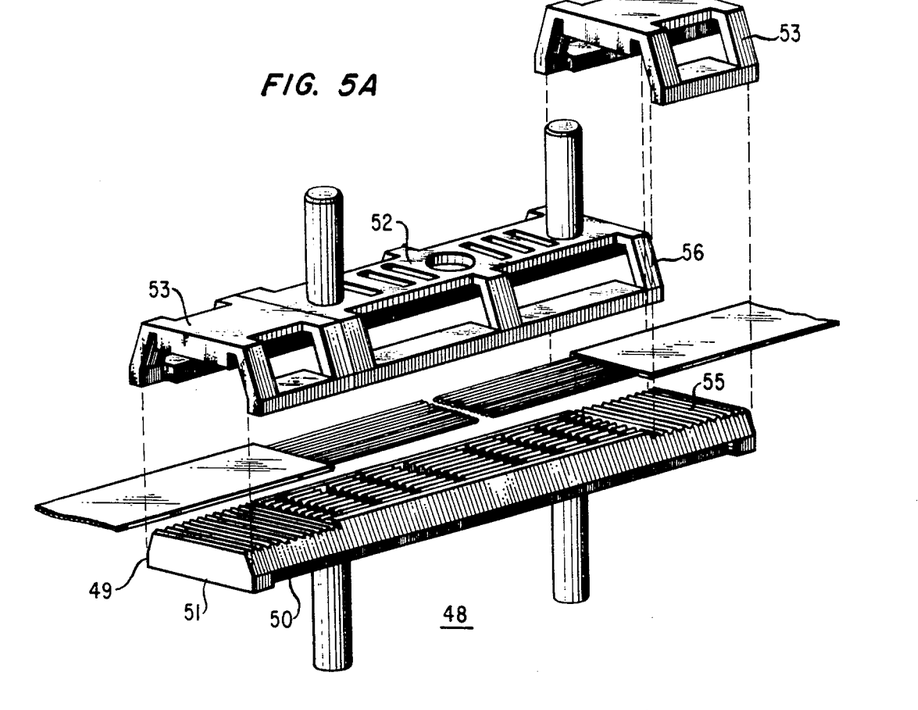
FIG. 5A illustrates in exploded assembly view an alternative latch-type connector made in accordance with this invention.
Figure 5B:
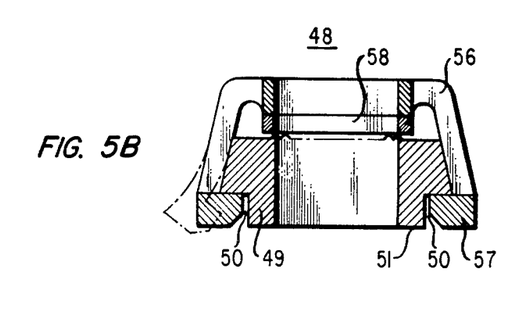
FIG. 5B depicts the FIG. 5A connector is a transverse cross-sectional view.

FIGS. 3, 4 and 5 illustrate variations of the basic connector 10 depicted in FIG. 1.

The FIG. 3 connector 33 is a reenterable connector which features a substrate 34 substantially identical to substrate 11, a three-piece cover 35 which consists of a central portion 36 and two end portions 37, which are configured to engage the central portion 36 to form a cover similar to cover 16, and a spring clip 38. Cover 35 mounts onto substrate 34 and spring clip 38 slips over both cover 35 and substrate 34 to hold them in mating engagement. The spring clip 38 comprises three separate resilient sections, 39, 40, and 41. The sections 39 and 41 supply separate localized forces on the end portions 37 to keep the ribbons 100 locked into place.

Shown in FIG. 4 is a permanent splice variation of the connector 10 in FIG. 1. The substrate 43 is modified to include troughs 44 for receiving epoxy material 45 along both sides of the fiber-receiving grooves 46. The cover 47 has two side sections 48 extending downwardly at an angle away from each other to fit into the troughs 44 of substrate 43.

To complete the splice after the fibers 101 have been abutted, cover 47 enters into intimate contact with the grooved surface 42 of substrate 43 to contain the abutted fibers 101 in their respective grooves 46. Advantageously, the troughs 44 contain the epoxy material 45 at a level substantially below the surface line of the grooves 46 to ensure that epoxy material 45, used to bond the connecting apparatus together, does not contaminate the grooved surface 42 or interfere with the grooved surface 42 in achieving mating engagement with cover 47. The end sections 48 enter the respective troughs 44 and displace the epoxy material 45 to the extent necessary for engagement of the cover 47 and substrate 43. The angularity of the side sections 48 ensure that cover 46 is securely embedded in the epoxy in the troughs 44 of substrate 43 once the epoxy 45 has set.

In another embodiment, a connector 48 features a latch-type means for locking the connector parts together. Referring to FIGS. 5A and 5B, substrate 49 is substantially identical to the FIG. 1 substrate 11 except for longitudinal notches 50 along the bottom surface 51 of substrate 49 at either side. The cover 52 comprises two end cover portions 53 with flexible latches 54 at either side that hook into notches 50 to clamp the respective ribbons 100 against the ribbon-gripping serrated surfaces 55 of substrate 49, and a central cover portion 56 with similar latches 57 at either side that also hook onto notches 50 to securely contain the abutted fibers 101 in their grooves 47. A compliant pad 58, on the underside of central cover portion 56, cushions the forces exerted on the fibers 101 by central cover portion 56.

As with connector 10, the various substrates are mounted to related splicing fixtures to utilize vacuum assistance during splicing. It is realized that the splicing fixtures are modified to receive the different connector configurations.

Figure 6:
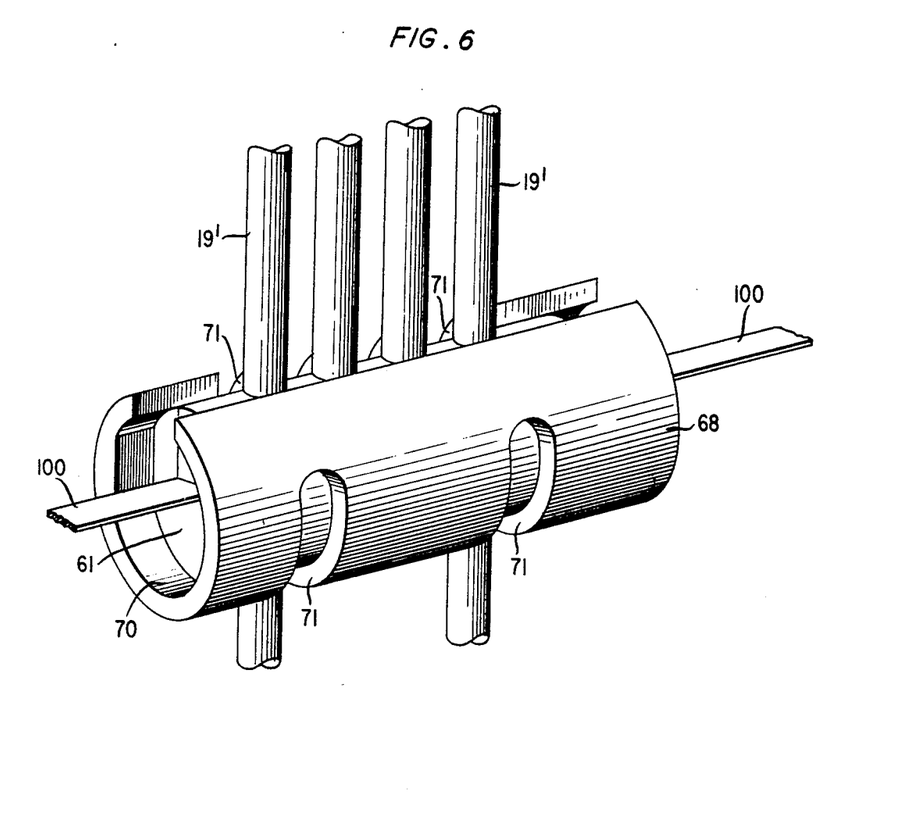
FIG. 6 illustrates in perspective view a further connector embodiment of this invention which facilitates reentry.
Figure 7:
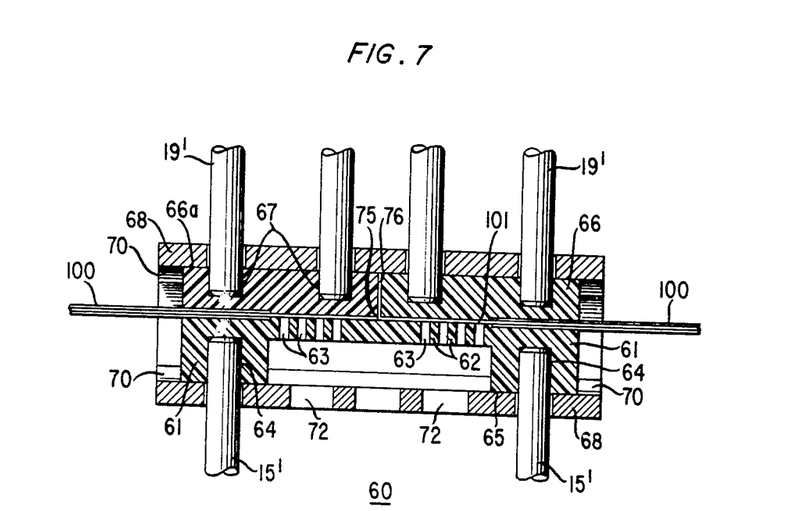
FIG. 7 depicts the FIG. 6 embodiment in longitudinal cross-sectional view.
Figure 8A:
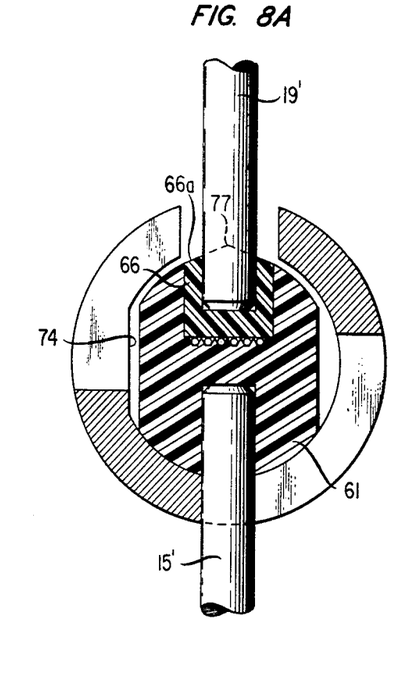
FIGS. 8A and 8B depict the FIG. 6 embodiment in transverse cross-sectional view in the open and closed positions, respectively.
Figure 8B:
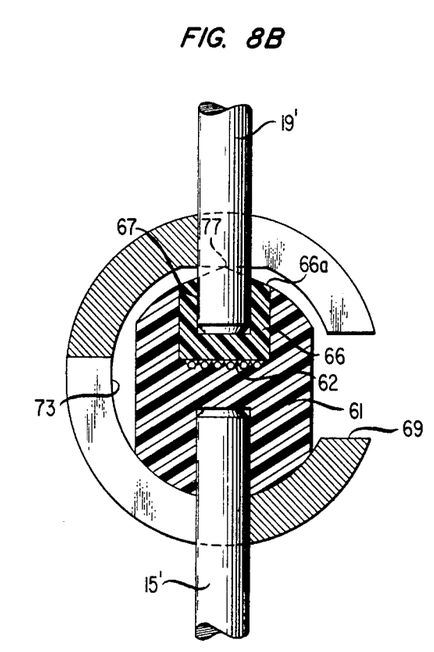

Shown in FIGS. 6–8 is an embodiment 60 of a reenterable connector made pursuant to this invention in which one-half of the splice, i.e., one array of fibers, can be dismantled from the connector without affecting the other half.

Similar to connector 10 in FIG. 1, reenterable connector 60 comprises a single substrate 61 with one set of fiber-receiving grooves 62 for aligning the exposed arrays of fibers 101 from both ribbons 100 and vacuum slots 63 normal to and cutting across the grooves 62 to assist in positioning the fibers 101. A single substrate 61 for alignment of both arrays in this reenterable connector eliminates manufacturing misalignment errors typically made where separate aligning components are used for each array of fibers.

Substrate 61 also comprises holes 64 along the substrate underside 65 to assist in positioning substrate 61, via assembly tool pins 15, which in this embodiment are removable from the connector, onto a vacuum fixture, which is similar to fixture 20 in FIG. 1.

In connector 60, two separate covers 66 mount onto substrate 61 to hold the separate fiber arrays in place after they have been positioned into the grooves 62.

The fibers arrays are positioned so they terminate substantially at the center 75 of substrate 61. Sufficient separation between the covers 66 is maintained to permit application of index matching material through a space 76. As clearly depicted in FIGS. 8A and 8B, the covers 66 are slightly angular cross-sectionally on their topsides 66a to form longitudinally protruding nodes 77. The covers 66 also comprise holes 67 on the topsides 66a for attaching the covers 66 to a cover holder, via assembly tooling pins 19', which in this embodiment are removable from the covers 66.

Pursuant to this invention, the connector 60 also features a substantially cylindrical shell 68 in which substrate 61 is loosely housed. Shell 68, which can advantageously be made of metal or extruded plastic, comprises a longitudinally split opening 69 which permits insertion and removal of covers 66 and ribbons 100 during splicing; interior ribs 70 at either end with which to contain substrate 61; pin slots 71 which permit rotation of shell 68 when the pins 15' and 19' are attached to substrate 61 and covers 66, respectively; vacuum slots 72 which operate as vacuum passages between the substrate vacuum slots 63 and a vacuum cavity of a vacuum base, which is similar to base 21 in FIG. 1 but modified to have a curved upper surface for receiving shell 68 and substrate 61 to form an airtight vacuum chamber.

Shell 68 readily rotates with respect to substrate 61 to either position the substrate 61 for the splicing operation, i.e., FIG. 8A, or to lock the covers 66 in place, i.e., FIG. 8B. The Shell's interior cross-section 73, which is substantially circular in configuration, comprises a raised portion 74, which reduces the diameter of the interior cross-section 66 at one section to lock the covers 64 in place by imparting a radial compressive force against the cover nodes 77 of the covers/substrate assembly.

As clearly depicted in FIG. 8A, the substrate 61 and covers 66 fit loosely in the shell 68 when the shell is rotated in the open or splicing position. To lock the covers in place, shell 68 is rotated approximately 90° until the covers 66 abut against raised portion 67, whereby the covers/substrate assembly is locked in place as clearly depicted in FIG. 8B.

It is apparent from FIGS. 8A and 8B that the shell pin slots 71 are cut out to allow shell rotation only of the 90°.

When the covers/substrate assembly is locked into place and the splicing operation is complete, the splice connector 60 is easily removed from the vacuum and cover assembly fixture by pulling the connector from the pins 15' and 19'.

The completed connector 60 is dismantled with the same splicing fixture.

In an alternative embodiment, shell 68 can be made of two half shells that are free to rotate with respect to each other so that one shell half can be left in the locked position with respect to the covers/substrate assembly while the other shell half is rotated to expose one of the covers 66 for dismantling or splicing.

Figure 9:
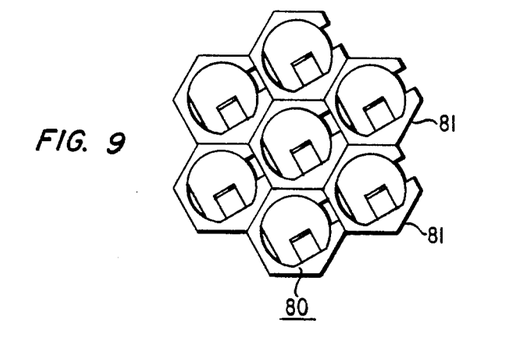
FIG. 9 illustrates a group of FIG. 6 connectors having an alternative shell geometry.

FIG. 9 shows a plurality of reenterable connectors 80 assembled together in a compact array. The connectors 80, while similar to connector 60 in interior design, have shells 81 featuring external hexagonal cross sections instead to facilitate nesting of many splices.

While the invention has been described with reference to specific embodiments, it is to be understood that various modifications thereto might be made without departing from the spirit and scope of the following claims.

What is claimed is:

1. Apparatus for connecting a first linear array of optical fibers to a second linear array, said apparatus of the type comprising a substrate which includes on a substrate surface parallel spaced fiber-receiving grooves for aligning and abutting the fibers of both arrays, a cover which fits into mating engagement with said substrate to contain said fibers in said grooves, and means for securing said cover to said substrate, characterized in that:

said substrate further comprises a plurality of vacuum slots for supplying air suction to said grooves to hold said fibers in said grooves with vacuum-assistance.

2. Apparatus pursuant to claim 1 where said securing means comprises:

means for latching said cover to said substrate.

3. Apparatus pursuant to claim 1 where each said vacuum slot comprises a first opening on said grooved substrate surface, which is the topside of said substrate, and a second opening on the underside of said substrate.

4. Apparatus pursuant to claim 1 where said fibers of each array are substantially aligned and abutted in the grooves with their ends at a preselected splice point on said substrate surface and where each array is assigned at least one vacuum slot for holding its said fibers in said grooves with vacuum-assistance, said vacuum slot for each array being sufficiently adjacent to said splice point to maintain said fibers of said respective arrays in said grooves at said splice point.

5. Apparatus pursuant to claim 4 where each said slot defines a passage substantially normal to said grooved substrate surface to draw said fibers towards the bottom of said grooves.

6. Apparatus pursuant to claim 1 where said securing means comprises:

means for adhesively bonding said cover to said substrate.

7. Apparatus pursuant to claim 6 where said substrate further comprises a trough on either side of said grooves in which bonding material is contained, and where said cover comprises two side sections which immerse into said bonding material of said troughs when said cover and substrate are in mating engagement.

8. Apparatus pursuant to claim 7 where said troughs contain said bonding material at a level substantially below the level of said grooves.

9. Apparatus pursuant to claim 7 where said cover side portions extend downwardly at an angle away from each other.

10. Apparatus pursuant to claim 1 where said securing means comprises:

a spring clip which slips over said cover and substrate to secure said cover and substrate in mating engagement.

11. Apparatus pursuant to claim 10 where said cover comprises three portions which fit together to form said cover, said first and third portions for securing said ribbons to said connecting apparatus, said second portion for containing said aligned fibers in their grooves; and where said spring clip comprises three separate resilient sections, each section for supplying a separate localized force against its corresponding cover portion.

12. Apparatus pursuant to claim 1 where said cover further comprises means for releasing vacuum pressure generated over said fiber receiving grooves.

13. Apparatus pursuant to claim 12 where said cover comprises a plurality of vent slots.

14. Apparatus pursuant to claim 1 where said linear arrays comprise fibers contained in ribbon structures, said substrate further comprising:

means at either end of said grooves for terminating said ribbon structures between said substrate and cover.

15. Apparatus pursuant to claim 14 where said ribbon terminating means comprises surfaces for gripping said ribbons.

16. Apparatus pursuant to claim 15 where said gripping surfaces are serrated.

17. Apparatus for connecting a first linear array of parallel-spaced fibers to a similar second array, said apparatus comprising:

a substrate comprising a plurality of parallel-spaced optical fiber receiving grooves for aligning and abutting corresponding fibers of each array and at least two vacuum slots with at least one slot for each array for supplying air suction to said grooves to hold said corresponding array of fibers in said grooves with vacuum-assistance;

a splice cover for each array of fibers, each cover fitting into mating engagement with said substrate to contain said corresponding aligned array of fibers in their grooves; and means for securing said covers to said substrate.

18. Apparatus pursuant to claim 17 where said securing means comprises:

a longitudinally split shell for housing said substrate, said shell having a longitudinal opening for receiving said arrays of fibers and said splice covers, said shell being capable of rotating with respect to said substrate to lock said splice covers into mating engagement with said substrate with its interior cross section.

19. Apparatus pursuant to claim 18 where said shell comprises a raised portion in its interior cross section for imparting a radial compressive force on said covers against said substrate.

20. Apparatus pursuant to claim 19 where said shell has an external hexagonal cross-section.

21. Apparatus for splicing a first linear array of parallel-spaced optical fibers to a similar second array, said apparatus comprising:

a substrate comprising a plurality of parallel spaced optical fiber receiving grooves for aligning and abutting corresponding fibers of each array on a substrate surface and at least two vacuum slots with at least one slot for each array;

a vacuum fixture on which said substrate mounts during splicing, whereby said vacuum fixture draws air through said vacuum slots to maintain said fibers being spliced in their respective grooves; and means for locking said fibers in said grooves to complete said splice whereby said vacuum fixture is removed.

* * * * *